United States Patent
Gupta et al.

(10) Patent No.: US 10,445,783 B2
(45) Date of Patent: Oct. 15, 2019

(54) TARGET AUDIENCE CONTENT INTERACTION QUANTIFICATION

(71) Applicant: Adobe Inc., San Jose, CA (US)

(72) Inventors: Shivani Gupta, Karnal (IN); Gaurush Hiranandani, Jaipur (IN); Anshul Agrawal, Indore (IN); Charanjit Singh Ghai, Nagar (IN)

(73) Assignee: Adobe Inc., San Jose, CA (US)

( * ) Notice: Subject to any disclaimer, the term of this patent is extended or adjusted under 35 U.S.C. 154(b) by 1012 days.

(21) Appl. No.: 14/548,061

(22) Filed: Nov. 19, 2014

(65) Prior Publication Data

US 2016/0140623 A1    May 19, 2016

(51) Int. Cl.
   *G06Q 30/02* (2012.01)

(52) U.S. Cl.
   CPC ..... *G06Q 30/0269* (2013.01); *G06Q 30/0204* (2013.01); *G06Q 30/0211* (2013.01)

(58) Field of Classification Search
   None
   See application file for complete search history.

(56) References Cited

U.S. PATENT DOCUMENTS

| | | | | |
|---|---|---|---|---|
| 2002/0031268 A1* | 3/2002 | Prabhakar | .......... | G06K 9/00456 382/224 |
| 2010/0312726 A1* | 12/2010 | Thompson | .......... | G06K 9/6254 706/12 |
| 2011/0060738 A1* | 3/2011 | Gates | .......... | G06F 17/30749 707/737 |
| 2016/0019595 A1* | 1/2016 | Wu | .......... | G06Q 30/0269 705/14.66 |

OTHER PUBLICATIONS

Yifan Chen et al., Advertising Keyword Suggestion Based on Concept Hierarchy, Feb. 11, 2008, Association for Computing Machinery, WSDM '08 Proceedings of the 2008 International Conference on Web Search and Data Mining, pp. 251-260. (Year: 2008).*

* cited by examiner

*Primary Examiner* — Scott D Gartland
*Assistant Examiner* — Christopher B Tokarczyk
(74) *Attorney, Agent, or Firm* — SBMC (57) ABSTRACT

Target audience content interaction techniques are described. In one or more implementations, a plurality of content is quantified by one or more computing devices as a content feature representation for each of the plurality of content. A plurality of content feature clusters are generated by the one or more computing devices based at least in part on similarity of the content feature representations, one to another. Content cluster interaction data is also created by the one or more computing devices that describes interaction of each of a plurality of users with the plurality of content. A plurality of user interaction clusters are calculated from the content cluster interaction data by the one or more computing devices based at least in part on similarity of the content cluster interaction data of the plurality of users, one to another. The calculated plurality of user interaction clusters are employed by the one or more computing devices to determine content preferences of a target audience.

20 Claims, 8 Drawing Sheets

902
Receive one or more inputs as a search query that references a target audience and search criteria to be employed in a search of content 904
Locate one or more items of a plurality of content based on the search criteria and the referenced target audience 906
Exposing the located one or more items of the plurality of content as one or more search results

TARGET AUDIENCE CONTENT INTERACTION QUANTIFICATION

BACKGROUND

Users are exposed to an ever increasing variety of content. However, there are no current techniques that support association of characteristics of the content with particular users, such as target audiences. For example, a creative professional may be tasked with designing content for exposure to a target audience, such as part of a marketing campaign.

Currently, however, there is no technological solution to the problem of "which kind of people like what type of content." Accordingly, the creative professional is forced to make a "best guess" as far as which content may be desired by the target audience, which may be inefficient and prone to error.

SUMMARY

Target audience content interaction techniques are described. In one or more implementations, a plurality of content is quantified by one or more computing devices as a content feature representation for each of the plurality of content. A plurality of content feature clusters are generated by the one or more computing devices based at least in part on similarity of the content feature representations, one to another. Content cluster interaction data is also created by the one or more computing devices that describes interaction of each of a plurality of users with the plurality of content. A plurality of user interaction clusters are calculated from the content cluster interaction data by the one or more computing devices based at least in part on similarity of the content cluster interaction data of the plurality of users, one to another. The calculated plurality of user interaction clusters are employed by the one or more computing devices to determine content preferences of a target audience.

In one or more implementations, a system includes one or more computing devices. The one or more computing devices are configured to perform operations including receiving one or more inputs as a search query that references a target audience and search criteria to be employed in a search of content, locating one or more items of a plurality of content based on the search criteria and the referenced target audience, and exposing the located one or more items of the plurality of content as one or more search results.

In one or more implementations, a system includes one or more computing devices. The one or more computing devices are configured to perform operations including quantifying a plurality of images using a neural network as a content feature representation for each of the plurality of images, generating a plurality of content feature clusters based at least in part on similarity of the content feature representations, one to another, creating content cluster interaction data that describes interaction of each of a plurality of users with the plurality of images, calculating a plurality of user interaction clusters from the content cluster interaction data based at least in part on similarity of the content cluster interaction data of the plurality of users, one to another, and employing the calculated plurality of user interaction clusters to determine content preferences of a target audience.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Currently, there are no conventional techniques that support association of characteristics of content with particular users, such as target audiences. Rather, conventional techniques typically rely on philosophical studies that are limited to classics problems to confirm guesses on correlations of characteristics and content with a target audience, e.g., Americans like baseball, Europeans like soccer, and so on. As such, creative professionals attempting to determine the likes of a target audience are forced to guess as to likely characteristics.

Target audience content interaction techniques are described. In one or more implementations, these techniques may be used to address the problem of "which kind of people like what types of content," such as which type of images, sound data, media, and so forth. This knowledge may be utilized in a variety of ways, such as to personalize search results for creative professions depending upon a specified target audience. To obtain this knowledge, techniques are described in the following in which content is analyzed to form content features representations, such as feature vectors. These representations are then used as a basis to cluster the content based on similarity.

User data describing user interaction with the content is utilized to form content cluster interaction data, which may represent content in particular clusters that the user has liked, e.g., as vectors. The content cluster interaction data may also be clustered to form user interaction clusters based on similarity of the interactions, one to another. A mapping may then be performed between the user interaction clusters and the content features clusters to determine which people like which clusters of content, which may be exposed as content preferences. These content preferences may be leveraged in a variety of ways, such as to rank items in a search result, determine whether a particular item of content will be liked by a target audience, and so on. Further discussion of these and other examples may be found in relation to the following sections.

In the following discussion, an example environment is first described that may employ techniques described herein. Example procedures are then described which may be performed in the example environment as well as other environments. Consequently, performance of the example procedures is not limited to the example environment and the example environment is not limited to performance of the example procedures.

Example Environment

Figure 1:
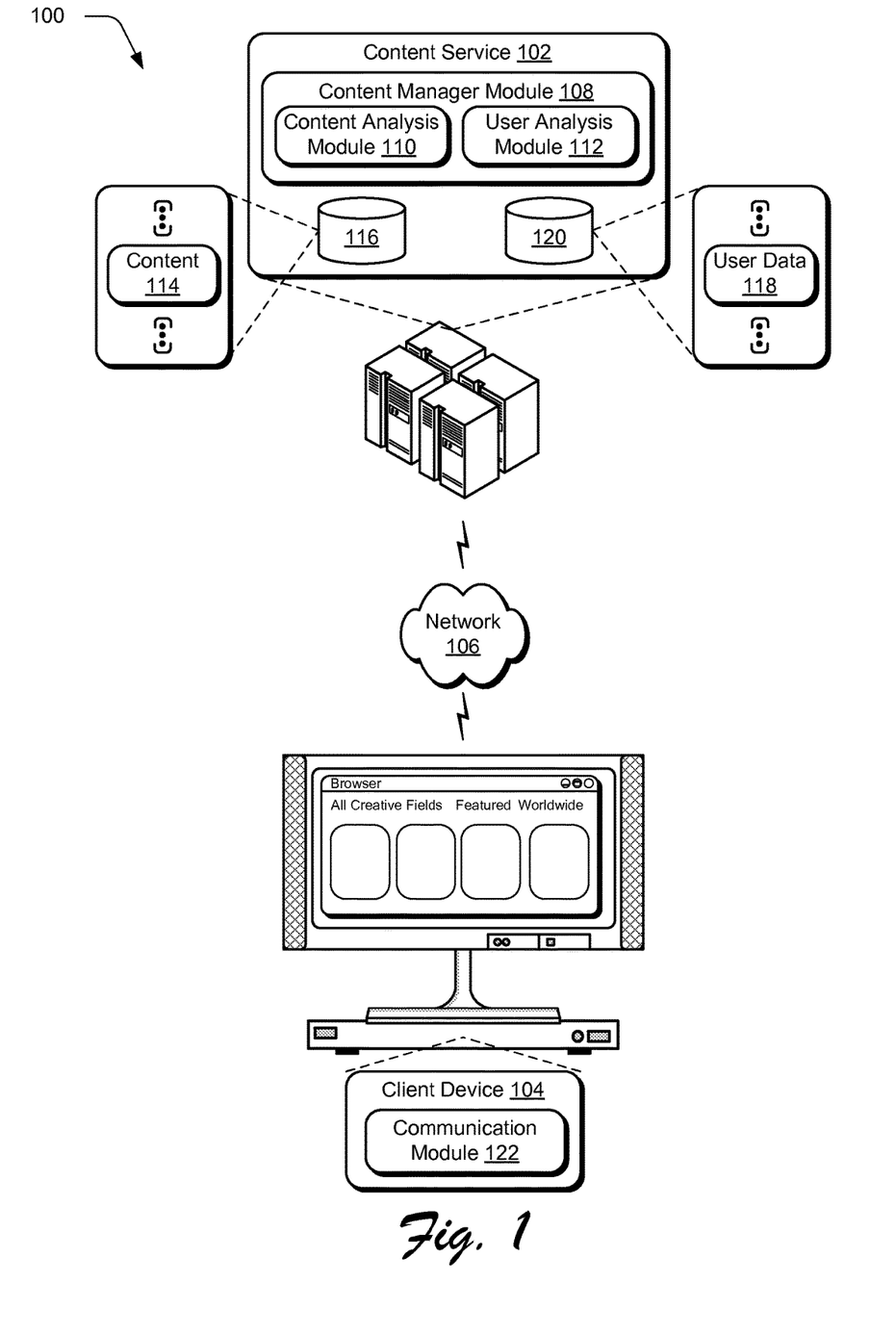
FIG. 1 is an illustration of an environment in an example implementation that is operable to employ content creation and deployment techniques described herein.

FIG. 1 is an illustration of an environment 100 in an example implementation that is operable to employ target audience content interaction quantification techniques described herein. The illustrated environment 100 includes a content service 102 and a client device 104 that are communicatively coupled, one to another, via a network 106. Although illustrated as a single entity, functionality represented by the content service 102 may be further divided across other entities that are communicatively coupled via the network 106, and so on.

Computing devices that are used to implement the content service 102 and the client device 104 may be configured in a variety of ways. Computing devices, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, although a single computing device is shown in some instances, computing devices may be representative of a plurality of different devices, such as multiple servers utilized by a business to perform operations "over the cloud" as shown for the content creation service 102 and the content deployment service 104, further discussion of which may be found in relation to FIG. 10.

The content service 102 is illustrated as including a content manager module 110 including a content analysis module 110 and a user analysis module 112. The content analysis module 110 is representative of functionality to manage and process content 114, which is illustrated as available via storage 116 of the content service 102 though as is readily apparent this data may be maintained elsewhere, e.g., a third-party service. Content 114 may take a variety of forms, such as images, sound data, media, and so forth.

The user analysis module 112 is representative of functionality to manage and process user data 118, which is also illustrated as available via storage 120 of the content service 102 though as is readily apparent this data may also be maintained elsewhere, e.g., a third-party service. The user data 118 may describe interaction of a plurality of users with the content 114 and as such may take a variety of forms. For example, the user data 118 may indicate which items of content 114 are "liked" by a respective user, may be determined expressly (e.g., a "like" in a social network service), inferentially (e.g., the user has saved a copy of the content, forwarded a copy of the content, interacted with the content multiple times), and so on The content manager module 108 may then leverage knowledge of the content 114 and the user data 118 in a variety of ways. The client device 104, for instance, may include a communication module 122 that is representative of functionality to access the content service 102 via the network 106. As such, the communication module 122 may be configured in a variety of ways, such as a browser, a network-enabled application, and so forth.

Regardless of how the communication module 122 is implemented, the content manager module 110 may provide a variety of functionality for access by the client device 104 that is related to the creation of content 114. Examples of this functionality include graphic design, video editing, web development, sound data processing, and photography. For example, functionality supported by the content manager module 108 may include digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth. Additionally, the content creation manager module 108 may also support an online social-media based portfolio service for content creators (e.g., Behance®), further discussion of which may be found in the following. Thus, a variety of applications may be accessed by the client device 104 to create content 114 having a variety of different forms.

As part of content creation, a creative professional may be tasked with addressing a target audience that is to interact with the content. Accordingly, the creative manager module 108 may employ techniques that may be used to expose information regarding a target audience. For example, suppose there is a creative professional on self-promotion website (such as Behance®, Dribble, and so on) who is assigned to create an image while keeping target audience in mind. The content manager module 108 may be configured to expose content preferences to the creative professional that describe abstract features (e.g., color, edges, shape, content, and so on) of the images that are liked by its target audience.

The content manager module 108 may do this by quantifying content (e.g., images) as content feature representations (e.g., feature vectors) that encapsulate abstract features and properties of the content 114. The content feature representations may then be clustered based on similarity, e.g., according to distances from each other so that similar content 114 is included in the same cluster.

One these clusters are created, content cluster interaction data may be created for each user present in a target audience to quantify user preferences, e.g., images a user liked. The content cluster interaction data, for instance, may be configured as a vector in which each dimension in the vector represents a fraction of the images that are appreciated (e.g., liked) by a user in that cluster. The content cluster interaction data (e.g., the vectors) may also be clustered according to their distances from each other such that similar uses are assigned to the same cluster.

Centroids of the clusters from the content cluster interaction data thus represent the likings of the target audience, which may be used in various ways, such as to arrange search results, determine a likelihood that content will be liked by a target audience, and so on. In this way, the techniques quantify the images as well as the users' likings among the various kind of images depending upon deep abstract features such as color, content, shape, edges, etc. Also, the techniques may address the profundity of a target audience to determine clustering among users. Further, the techniques may use the top most liked clusters (in the form of centroids) to describe target audience likings.

In this way, the techniques may be used to determine which clusters of content which are liked by a particular section of users. As these techniques may be applied to a variety of different data, these techniques may be extended to different categories of users, e.g., based on age group, nationality, geographic location, and so on to create any group of users and determine their likings, predict any bias toward content by any group of people, and so on. Further discussion of these and other examples may be found beginning in the following description and is shown in a corresponding figure.

Target Audience Content Interaction Quantification

Figure 2:
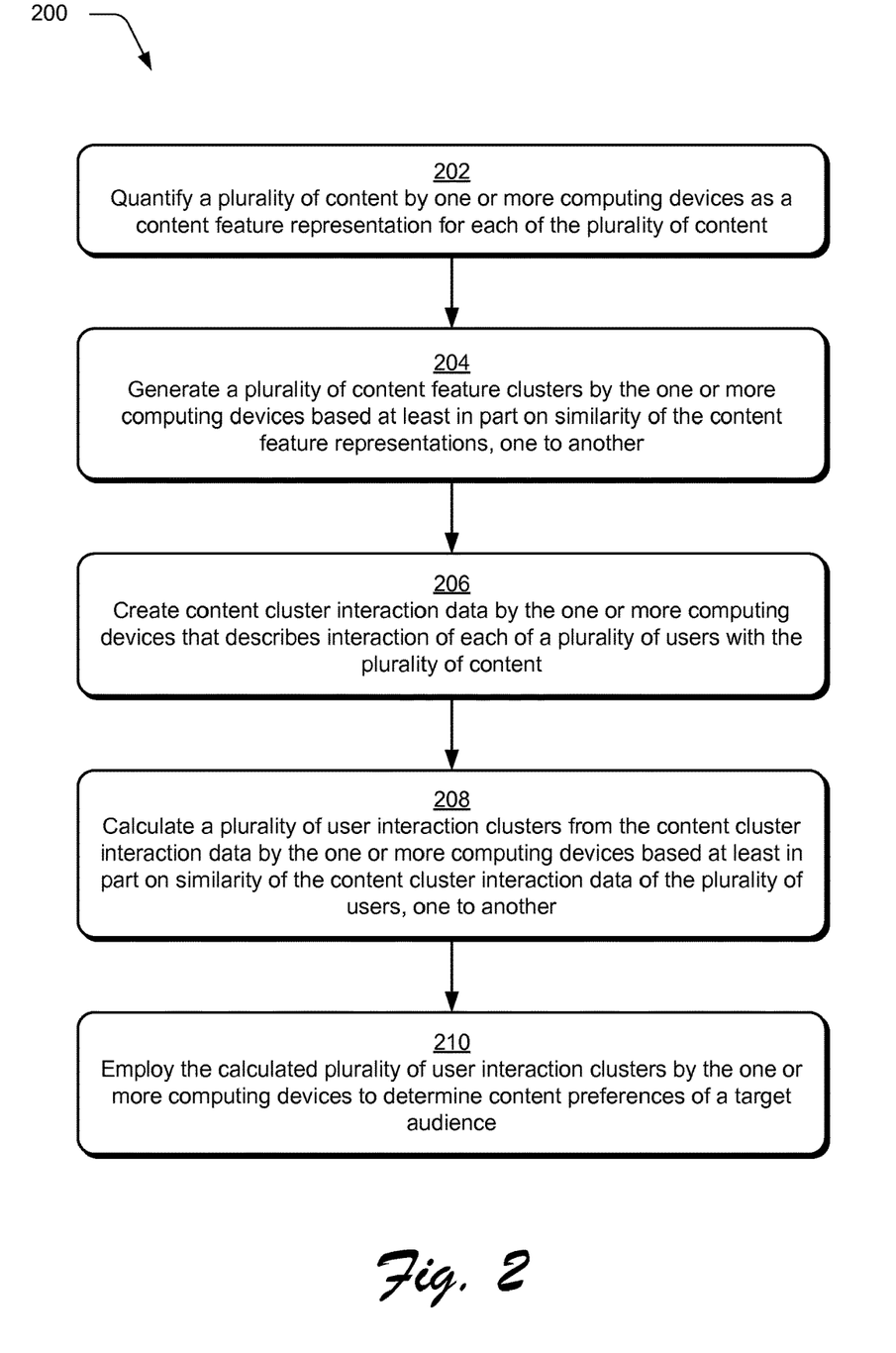
FIG. 2 is a flow diagram depicting a procedure in an example implementation in which clustering of user data and content is performed that quantifies target audience content interaction.

FIG. 2 depicts a procedure 200 in an example implementation in which clustering of user data and content is performed that quantifies target audience content interaction. The following discussion techniques that may be implemented utilizing the previously described systems and devices. As such, aspects of the procedure may be implemented in hardware, firmware, or software, or a combination thereof. The procedures are shown as a set of blocks that specify operations performed by one or more devices and are not necessarily limited to the orders shown for performing the operations by the respective blocks. The following discussion references the procedure in FIG. 2 as well as systems 300-800 of FIGS. 3-8 interchangeably.

Figure 3:
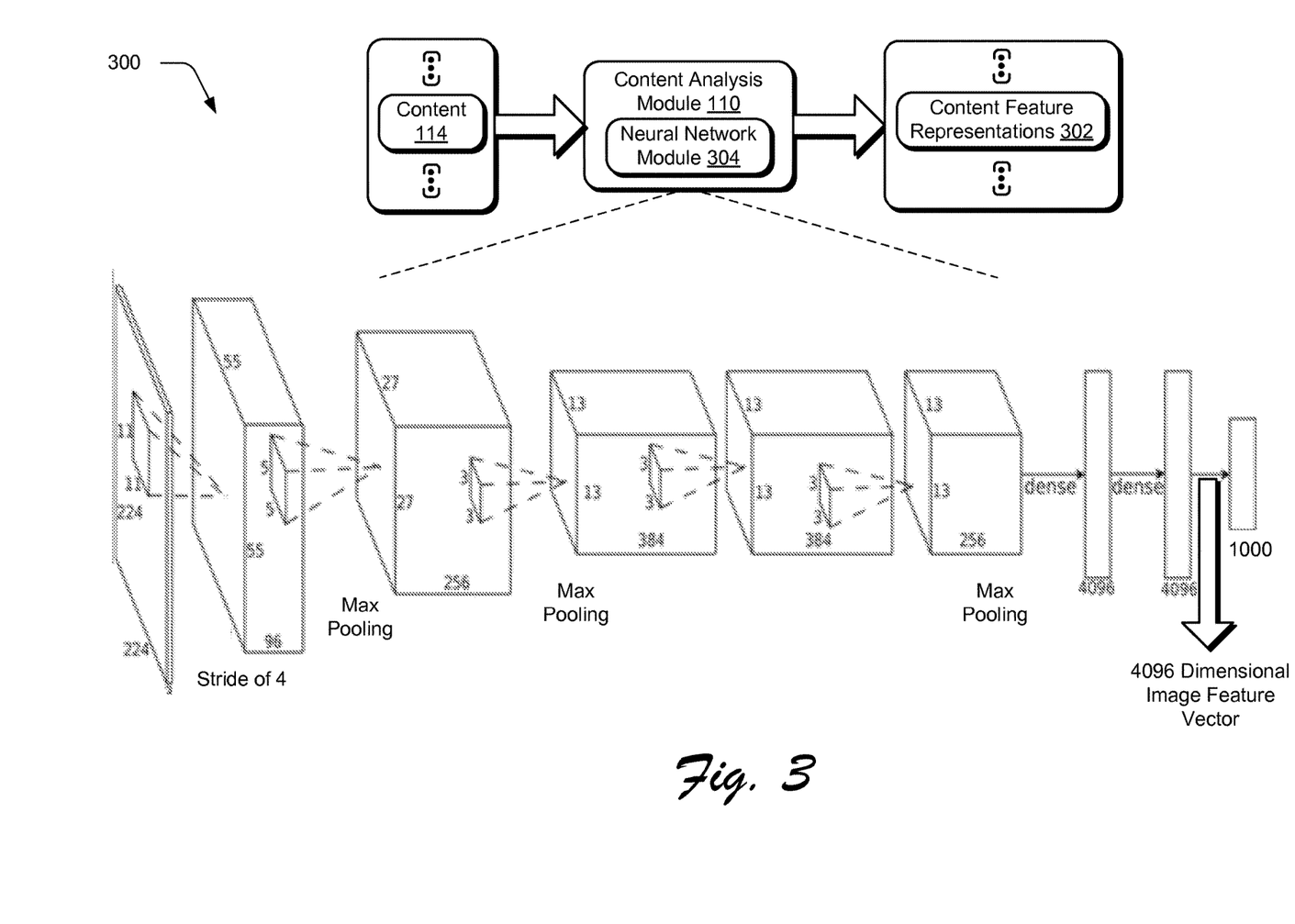
FIG. 3 depicts a system in an example implementation in which content feature representations are generated that abstract content characteristics.

FIG. 3 depicts a system 300 in an example implementation in which content feature representations are generated that abstract content characteristics. A plurality of content 114 is quantified by one or more computing devices as a content feature representation 302 of each of the plurality of content 114 (block 202). Content feature representations 302 may be configured in a variety of ways, such as a feature vector in which each dimension of the vector represents characteristics of the content. A variety of technique may be utilized to generate the vectors, such as a scale-invariant feature transform (SIFT), a neural network, and so on.

As illustrated in FIG. 3, for instance, the content analysis module 110 includes a neural network module 304 that is representative of neural network functionality that is usable to analyze content 114 to determine characteristics of the content 114. For example, the neural network module 304 may analyze images based on color, edges, shapes, content, layout, and other characteristics to generate a representation of the images that summarizes deep abstract features of the images.

The neural network module 304 is illustrated in this example as including seven neural layers of which some are convoluted and some are fully connected. Whenever content 114 is passed to the neural network module 304, neurons at various levels analyze that content 114 and pass it on the next level. At the end of the seventh layer in this example, a 4096-dimensional feature vector is generated as a content feature representation 302 which is a result of response from the neurons at the last level. This feature vector can be taken as a more detailed representation of the content 114 which includes 4096 real values such that each value determines the realization of the image by each neuron.

Figure 4:
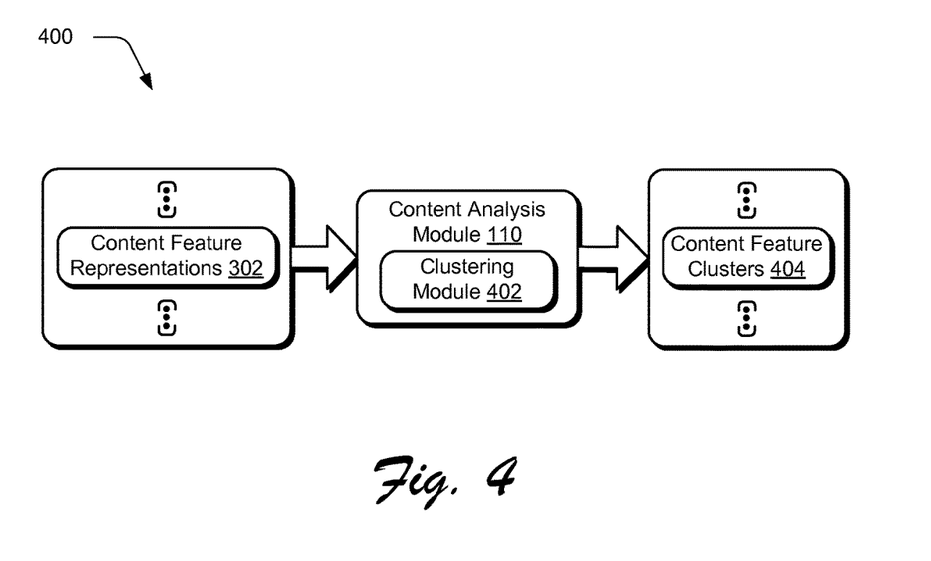
FIG. 4 depicts a system in an example implementation in which content feature representations of FIG. 3 are clustered.

In one or more implementations, it is estimated that there are around more than 25 million images on Behance®. A randomly selected dataset of 0.4 million images may be created from Behance® as a reasonable statistical sample to represent the whole set of images on a 4096 dimensional space. Let the set of images be "I." Each image of "I" may be fed to the neural network to obtain the corresponding feature vector for the image in this example. Thus, each image of the set is represented by its corresponding 4096 dimensional vector as the content feature representation 302 in this example. It should be readily apparent that these techniques are equally applicable to other types of content, such as sound data, media, and so forth FIG. 4 depicts a system 400 in an example implementation in which the content feature representations 302 of FIG. 3 are clustered. A plurality of content feature clusters are generated by the one or more computing devices based at least in part on similarity of the content feature representations, one to another (block 204). The content analysis module 110, for instance, may employ a clustering module 402 to assign the content feature representations 302 (and thus their corresponding content) to content feature cluster 404. This may be performed in a variety of ways.

A k-means (e.g., Lloyd) algorithm, for instance, may be employed by the clustering module 402 to cluster the content feature representations 302 into "k" clusters, thereby achieving "k" centroids as a result. In one or more implementations, a predefined value for "k" is chosen (e.g., 500) based on a Silhouette number, which is a prominent way to determine a number of clusters in unsupervised clustering. A variety of other values are also contemplated without departing from the spirit and scope thereof.

Figure 5:
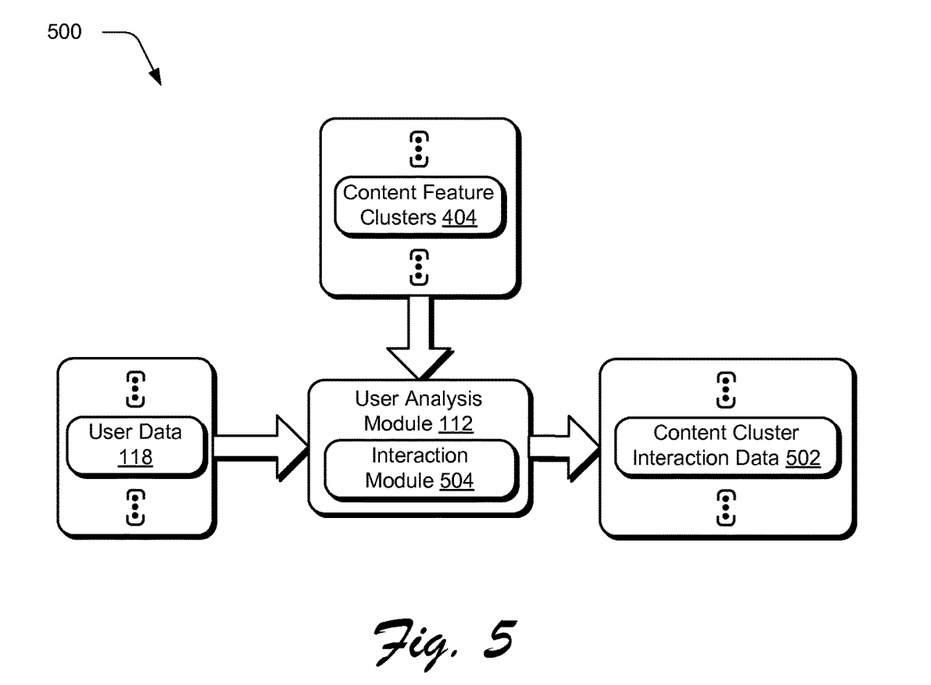
FIG. 5 depicts a system in an example implementation in which content cluster interaction data is generated from user data using content feature clusters of FIG. 4.

FIG. 5 depicts a system 500 in an example implementation in which content cluster interaction data 502 is generated from the user data 118 using content feature clusters 404 of FIG. 4. Content cluster interaction data 502 is created by the one or more computing devices that describes interaction of each of a plurality of users with the plurality of content (block 206). The user analysis module 112 in this example utilizes an interaction module 504 that is representative of functionality to create the content cluster interaction data 502.

For example, an amount of user data 118 corresponding to a predefined number of users (e.g., 1,000) may be sampled, e.g., who belong to an "America" target audience. After clustering of the content to form the content feature clusters 404, content cluster interaction data 502 may be generated by the interaction module 504 that describes interaction of the users with the content in the content feature clusters 404.

The content cluster interaction data 502, for instance, may be formed as a "k" dimensional vector that describes user interaction with the content, e.g., "likes" or other user appreciation or disapproval. Each dimension of the vector representation a fraction of content that the user has liked in that cluster and thus may be references as a vector in "[0,1]$^{k}$". If a user has liked one hundred images, for instance, in which ten are from cluster one, thirty are from cluster three, forty are from cluster five, and twenty are from cluster six, the vector may be expressed as follows:

(0.1, 0.0, 0.3, 0.0, 0.4, 0.2, 0.0, 0.0, . . . )

The content cluster interaction data 502 may take a variety of other forms without departing from the spirit and scope thereof.

Figure 6:
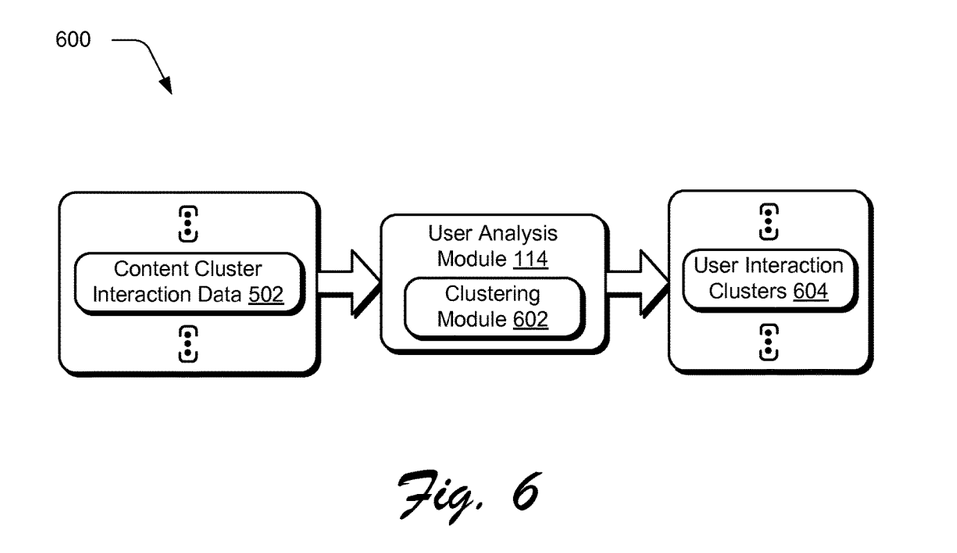
FIG. 6 depicts a system in an example implementation in which content cluster interaction data of FIG. 5 is clustered.

FIG. 6 depicts a system 600 in an example implementation in which the content cluster interaction data 502 of FIG. 5 is clustered. A plurality of user interaction clusters are calculated from the content cluster interaction data by the one or more computing devices based at least in part on similarity of the content cluster interact data of the plurality of users, one to another (block 208). The user analysis module 114, for instance, may also employ a clustering module 602 to form user interaction clusters 604 from the content cluster interaction data 502.

Continuing with the previous example, after creating the content cluster interaction data 502 (e.g., the vectors) for the users, the clustering module 602 of the user analysis module 114 may use a k-means (e.g., Lloyd) algorithm to cluster users into "m" clusters to get "m" centroids. A value of "m" may be chosen in a variety of ways, such as "m=25" based on a Silhouette number in this example.

Clustering may be used accommodate the variations in the likings of users in a broader dataset, such as Americans in this example. As is readily apparent there may be Americans of different types depending on gender, age, profession, interests, and so on whose liking may vary across the mentioned categories. Accordingly, if a more specific target audience is provided then a lesser number of clusters may suffice. Therefore, the higher the specification of the target audience lesser the number of clusters that may be used even to the point of using a single cluster.

Figure 7:
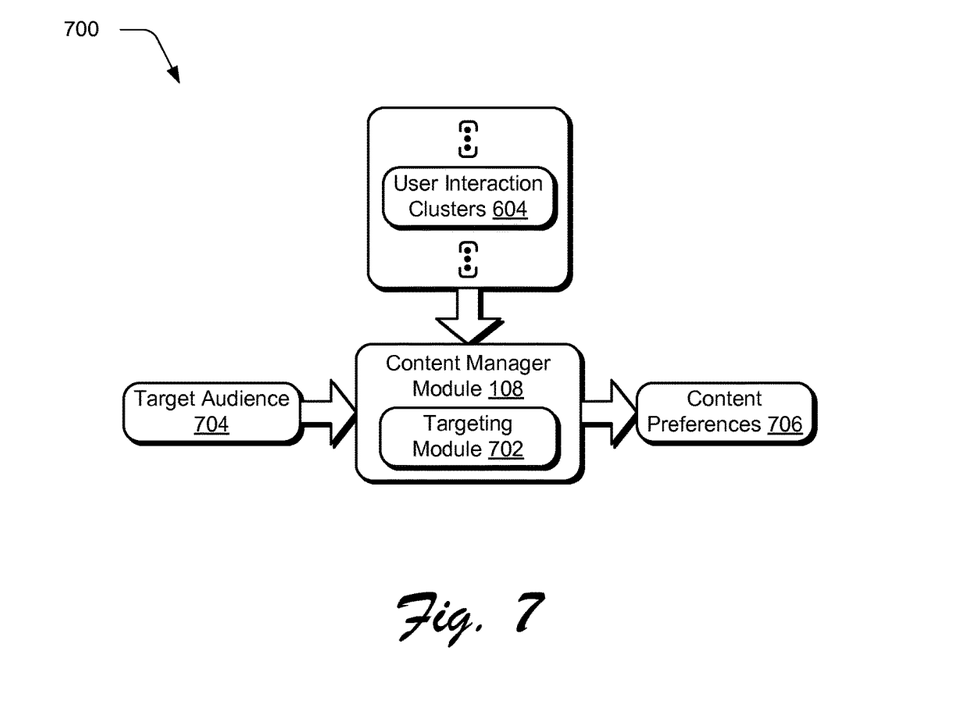
FIG. 7 depicts an example system in an example implementation in which user interaction clusters as generated in FIG. 6 are used to determine content preferences for a target audience.

The calculated plurality of user interaction clusters may be employed by the one or more computing devices to determine content preferences of a target audience (block 210) in a variety of ways. For example, FIG. 7 depicts an example system 700 in which user interaction clusters 604 as generated in FIG. 6 are used to determine content preferences for a target audience. The content manager module 108, for instance, may include a targeting module 702 that is representative of functionality relating to a target audience 704.

The targeting module 702 in this example is illustrated as receiving an input that includes a description of a target audience 704. This description may then be compared by the targeting module 702 with the user interaction clusters 604 to determine content preferences 706 of the target audience, such as characteristics of content "liked" by the target audience 704. This may be leveraged in a variety of ways, such as for a creative professional to learn the content preferences 706 as output in a user interface that are then employed by the artist in the creation of another item of content, e.g., an image having one or more of the content preferences 706. In this way, the item of content created by the creative professional has an increased likelihood of being of interest to the target audience 704.

Figure 8:
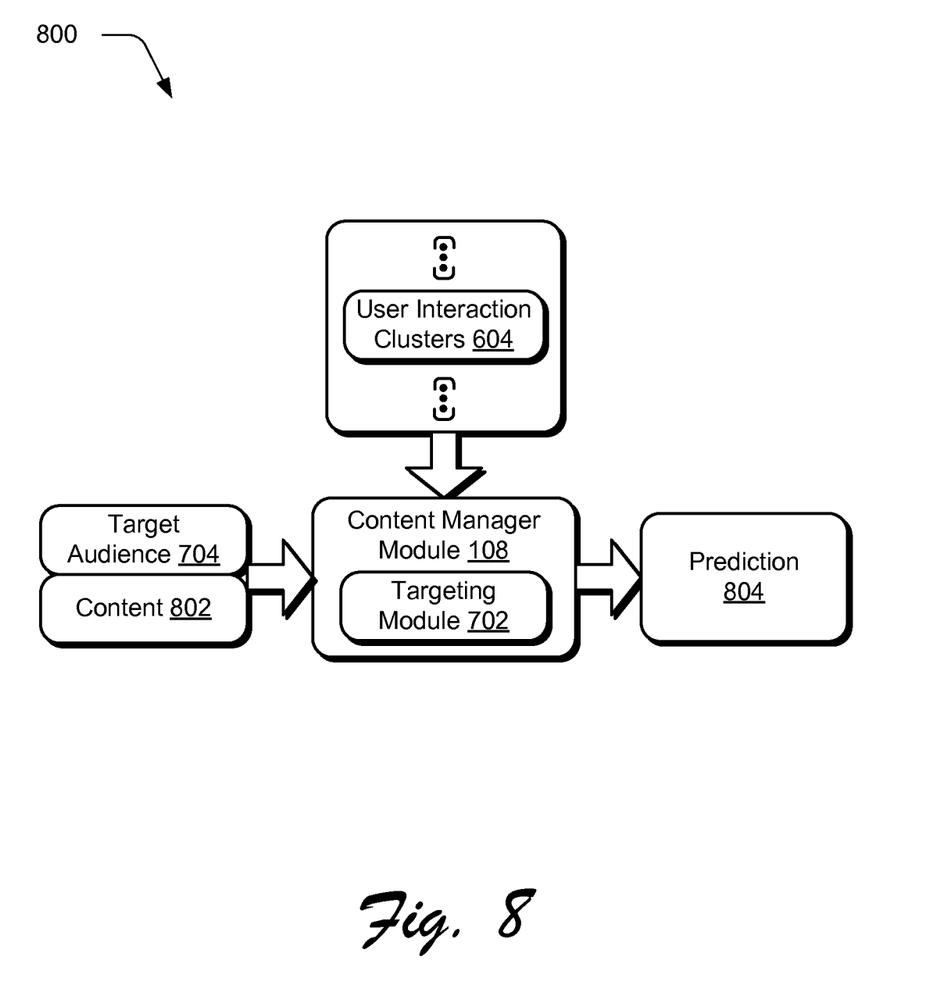
FIG. 8 depicts an example system in which user interaction clusters as generated in FIG. 6 along with a description of a target audience and content are utilized to predict a likelihood that the target audience will like the content.

In another example, FIG. 8 depicts an example system 800 in which user interaction clusters 604 as generated in FIG. 6 along with a description of a target audience and content are utilized to predict a likelihood that the target audience will like the content. Similar to FIG. 7, the content manager module 108 include a targeting module 702. The targeting module 702 in this example, however, receives an inputs a description of a target audience 704 and content 802 that is to be exposed for interaction with the target audience 704.

The targeting module 702 of the content manager module 108 may then employ the user interaction clusters 604 to formulate a prediction 804 as to whether the content 802 will meet with approval or disapproval by the target audience 704. For example, a Euclidean distance may be calculated between a feature vector of the content 802 and each of the user interaction clusters 604. In this way, a creative professional may receive an indication of how likely the content 802 designed for the target audience 704 (e.g., as part of a marketing campaign) will be favorably received.

The targeting module 702 may leverage this information in a variety of other ways, such as to rank search results that are to be exposed to or correspond to a target audience 704, to identify another item of content that is not included in the plurality of content that has a likelihood over a threshold of being liked by users in the target audience, and so on. For example, the targeting module 702 may be used to find other content (e.g., images) that may be used to update images included in a marketing campaign to increase a likelihood that a user will interact with the images and therefore the campaign.

Figure 9:
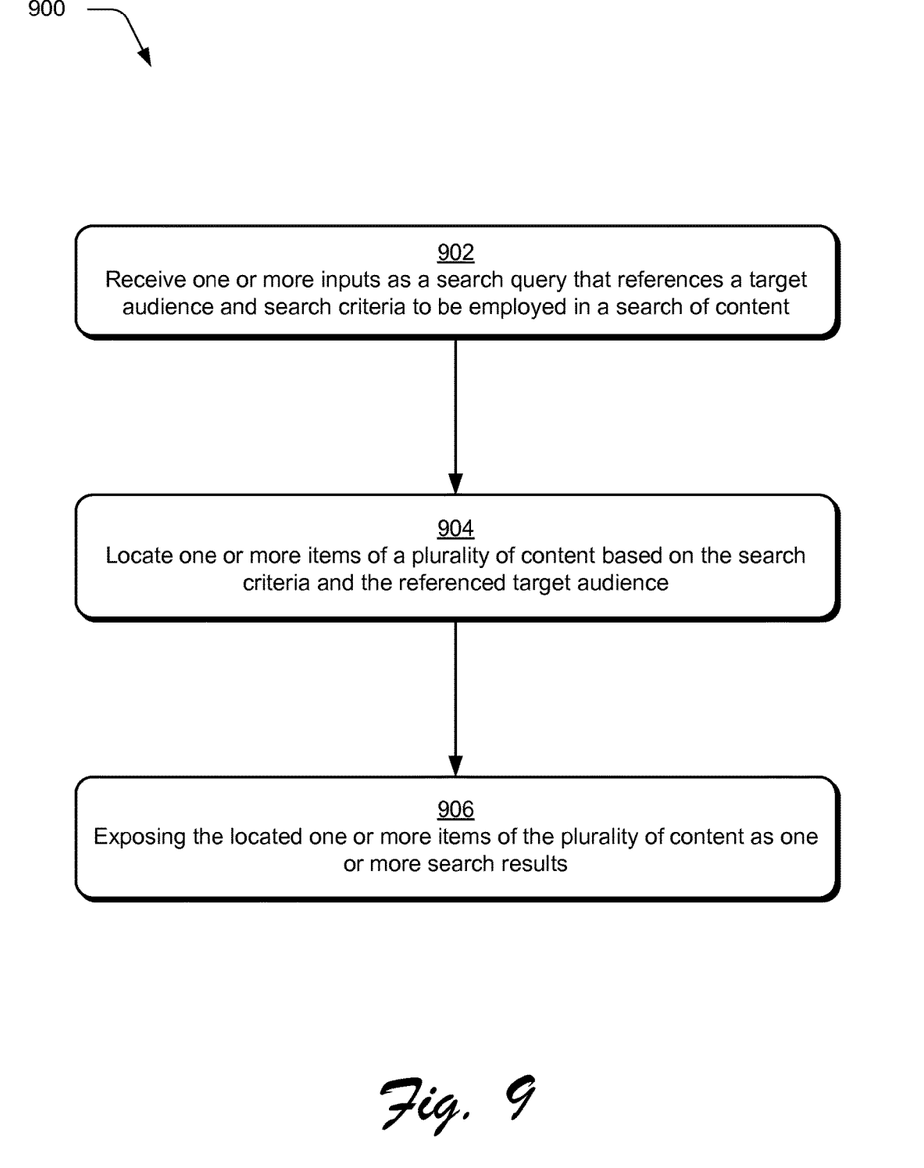
FIG. 9 is a flow diagram depicting a procedure in an example implementation in which items of are plurality of content are located based on search criteria and a referenced target audience.

FIG. 9 depicts a procedure 900 in an example implementation in which items of are plurality of content are located based on search criteria and a referenced target audience. The following discussion techniques that may be implemented utilizing the previously described systems and devices. As such, aspects of the procedure may be implemented in hardware, firmware, or software, or a combination thereof. The procedures are shown as a set of blocks that specify operations performed by one or more devices and are not necessarily limited to the orders shown for performing the operations by the respective blocks. The following discussion references the procedure in FIG. 9 as well as systems 300-800 of FIGS. 1-8.

One or more inputs are received as a search query that references a target audience and search criteria to be employed in a search of content (block 902). A user, for instance, may interact with a client device 104 to access a content service 102 that acts as a social network service to creative professionals, e.g., Behance®. The user may enter into a user interface a search query (e.g., which may describe content generally) as well as a target audience that is to view the content, such as part of a marketing campaign.

One or more items of a plurality of content are located based on the search criteria and the referenced target audience (block 904). The content service 102 may then employ the clustering previously described to locate clusters and corresponding content that corresponds to the target audience and the search criteria.

The located one or more items of the plurality of content are exposed as one or more search results (block 906). The items, for instance, may be displayed in a user interface. Further, these items may be ranked in a variety of ways, such as corresponding to the search criteria, likelihood of being liked by the target audience, and so forth. A variety of other examples are also contemplated without departing from the spirit and scope described herein.

Example System and Device

Figure 10:
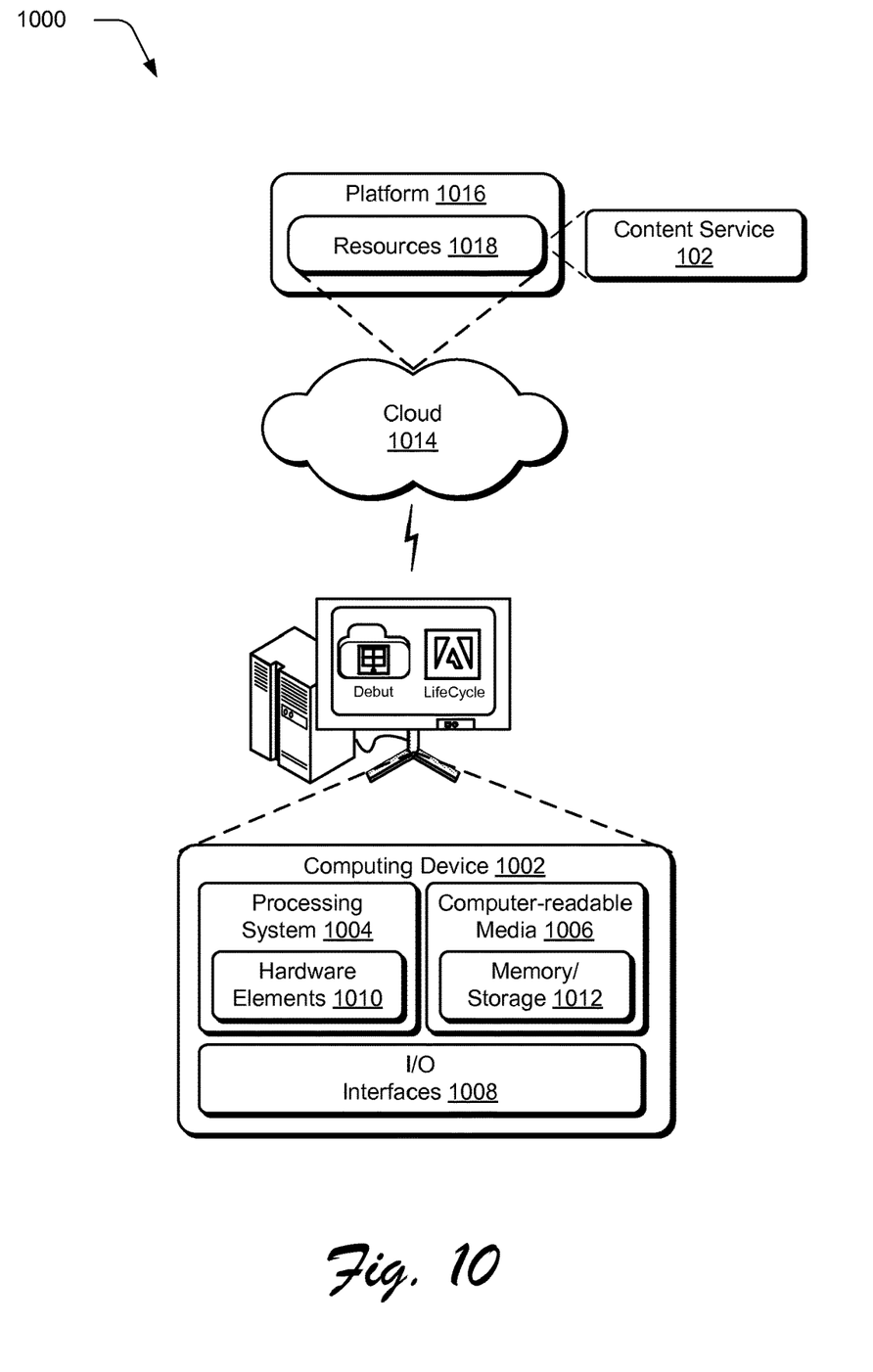
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the content service 102. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   generating content feature representations, each content feature representation quantifying abstract features of a content item of a plurality of content items;
   clustering the generated content feature representations based at least in part on similarity of the generated content feature representations;
   determining, for each user in a target audience of users:
   a first amount comprising an amount of a specific type of user interaction with content items corresponding to each cluster of the content feature representations, the first amount determined for each of the clusters on a cluster-by-cluster basis;
   a second amount comprising a total amount of the specific type of user interaction with the plurality of content items; and
   proportions of the specific type of user interaction corresponding to each of the clusters of content feature representations, the proportions determined based on the first amount and the second amount;
   creating interaction data for the users of the target audience that describes the determined proportions;
   clustering the interaction data based at least in part on similarity of the interaction data created for the users of the target audience;
   generating a prediction that an item of target content not included in the plurality of content items will be favorably received by the target audience by determining a similarity between a representation of the item of target content and the clusters of interaction data; and
   generating, for communication to a client device, a visual representation of a likelihood that the item of target content will be favorably received by the target audience as indicated by the prediction, the visual representation configured for display with the item of target content via a user interface.

2. A method as described in claim 1, wherein generating the content feature representations is performed using a neural network.

3. A method as described in claim 1, wherein each of the content feature representations is configured as one or more feature vectors that encapsulate the abstract features and properties of respective content items.

4. A method as described in claim 1, wherein clustering the generated content feature representations is based on determined distances between the content feature representations, one to another.

5. A method as described in claim 1, wherein creating the interaction data includes generating one or more vectors in which each dimension in a vector describes a proportion of the specific type of user interaction with the content items that correspond to a given cluster of the content feature representations, wherein the specific type of user interaction corresponds to a like and the content items correspond to a set of images.

6. A method as described in claim 1, further comprising employing the clusters of interaction data to determine content preferences of the target audience.

7. A method as described in claim 6, wherein the employing includes using the content preferences of the target audience to rank content in a search result.

8. A method as described in claim 7, wherein the content ranked in the search result is ordered according to a likelihood of being liked by the target audience.

9. A method as described in claim 6, wherein the employing includes using the content preferences of the target audience to identify another item of content that is not included in the plurality of content items and has a likelihood over a threshold of being liked by the target audience.

10. A system comprising:
    one or more computing devices configured to perform operations comprising:
    generating content feature representations, each content feature representation quantifying abstract features of an image of a plurality of images;

generating a first set of clusters of the generated content feature representations based at least in part on similarity of the content feature representations, one to another;

determining, for each user in a target audience of users:
- a first amount comprising a number of user likes with the images that correspond to each cluster of the first set;
- a second amount comprising a total number of the user likes with the plurality of images; and
- proportions of the user likes involving each of the clusters of the first set, the proportions determined based on the first amount and the second amount;

creating interaction data for the users of the target audience that describes the determined proportions;

generating a second set of clusters of the interaction data based at least in part on similarity of the interaction data created for the users of the target audience;

receiving input specifying a search query, the search query referencing the target audience and search criteria to be employed in a search of the plurality of images;

generating a ranking of the second set of clusters based on similarity of a centroid value for each cluster of the second set to target characteristics comprising quantification of the target audience and the search criteria;

identifying one or more images of the plurality of images corresponding to one or more clusters of the second set based on the ranking; and generating a user interface to display a search result which includes the identified images in response to the search query.

11. A system as described in claim 10, wherein each of the content feature representations is configured as one or more feature vectors that encapsulate the abstract features and properties of respective images.

12. A system as described in claim 10, wherein creating the interaction data includes generating one or more vectors in which each dimension in a vector describes a proportion of the user likes with the images that correspond to a given cluster of the first set.

13. A system as described in claim 10, wherein the operations further comprise identifying another item of content that is not included in the plurality of images that has a likelihood over a threshold of being liked by the target audience based on the ranking.

14. A system as described in claim 10, wherein the operations further comprise:
- determining whether another item of content received as input by the one or more computing devices has a likelihood of being liked by the target audience based on the ranking; and
- responsive to determining that the other item of content has a likelihood of being liked by the target audience, configuring the search result to further include the other item of content.

15. A system as described in claim 10, further comprising employing the second set of clusters to determine content preferences of the target audience.

16. A method comprising:
- generating content feature representations, each of the content feature representations quantifying abstract features of a content item of a plurality of content items;
- clustering the generated content feature representations based at least in part on similarity of the content feature representations, one to another;
- determining, for each user in a target audience of users:
  - a first amount comprising a number of a specific type of user interaction with content items that correspond to each cluster of the content feature representations;
  - a second amount comprising a total number of the specific type of user interaction with the plurality of content items; and
  - proportions of the specific type of user interaction corresponding to each of the clusters of content feature representations, the proportions determined based on the first amount and the second amount;
- creating interaction data for the users of the target audience that describes the determined proportions;
- clustering the interaction data based at least in part on similarity of the interaction data created for the users of the target audience;
- receiving inputs specifying a search query, the search query referencing target audience and search criteria to be employed in a search of the plurality of content;
- generating a ranking of the clusters of interaction data based on similarity between the clusters of interaction data and target characteristics comprising quantification of the target audience and the search criteria;
- identifying one or more items of the plurality of content items corresponding to one or more of the clusters of interaction data based on the ranking; and
- generating a user interface to display a search result which includes the identified content items in response to the search query.

17. A method as described in claim 16, further comprising employing the ranking to determine content preferences of the target audience.

18. A method as described in claim 16, further comprising:
- determining content preferences of the target audience based on the ranking;
- receiving an additional item of content not included in the plurality of content items;
- generating an additional content feature representation that represents the additional item of content;
- generating a prediction that the additional item of content will be favorably received by the target audience based at least in part on a similarity between the additional content feature representation and each of the clusters of interaction data; and
- determining whether to expose the additional item of content as a search result in response to the search query based on the prediction.

19. A method as described in claim 16, wherein generating the content feature representations is performed using a neural network.

20. A method as described in claim 16, wherein the content feature representations are configured as one or more feature vectors that encapsulate the abstract features and properties of a respective content item.

* * * * *